(12) United States Patent
Al-kadi et al.

(10) Patent No.: US 11,516,621 B2
(45) Date of Patent: Nov. 29, 2022

(54) LOCALIZATION DEVICE AND METHOD OF OPERATING A LOCALIZATION DEVICE

(71) Applicant: NXP B.V., Eindhoven (NL)

(72) Inventors: Ghiath Al-kadi, Graz (AT); Ulrich Andreas Muehlmann, Graz (AT); Michael Schober, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/182,317

(22) Filed: Feb. 23, 2021

(65) Prior Publication Data

US 2021/0289320 A1 Sep. 16, 2021

(30) Foreign Application Priority Data

Mar. 16, 2020 (EP) .................................... 20163370

(51) Int. Cl.
*H04W 4/02* (2018.01)

(52) U.S. Cl.
CPC .................................. *H04W 4/025* (2013.01)

(58) Field of Classification Search
CPC ..... H04W 4/029; H04W 4/023; H04W 24/02; H04W 4/33; H04W 4/38; H04W 64/003; H04W 24/10; H04W 4/02; H04W 4/025; H04W 4/026; H04W 4/70; H04W 52/0254; H04W 64/00
See application file for complete search history.

(56) References Cited

U.S. PATENT DOCUMENTS

| 2016/0242135 | A1 | 8/2016 | McLaughlin et al. |
| 2017/0142680 | A1* | 5/2017 | Malkin .................... G01S 5/00 |
| 2019/0200339 | A1* | 6/2019 | Handte ............... H04W 64/006 |
| 2020/0259896 | A1* | 8/2020 | Sachs ............... G06K 19/06028 |

OTHER PUBLICATIONS

Divya, R. et al.; "Non-Line-of-Sight Environment Based Localization in Wireless Sensor Networks;" Published 2014 International Journal of Computer Applications; vol. 96, No. 6; DOI:10.5120/16802-6520.

Oberholzer, Georg et al.; "SpiderBat: Augmenting Wireless Sensor Networks with Distance and Angle Information;" 2011 10th International Conference on Information Processing in Sensor Networks (ISPN), Apr. 12, 2011.

(Continued)

*Primary Examiner* — Kwasi Karikari

(57) ABSTRACT

In accordance with a first aspect of the present disclosure, a localization device is provided, comprising: an ultra-wideband, UWB, communication unit configured to transmit a localization signal to an external device and to receive a response signal from the external device; an angle of arrival measurement unit configured to measure an angle at which the response signal is received; an orientation sensor configured to sense an orientation of the localization device; and a processing unit configured to determine if an angle at which the localization signal is received by the external device, an orientation of the external device, said orientation of the localization device, and said angle at which the response signal is received meet a predefined relationship. In accordance with a second aspect of the present disclosure, a corresponding method of operating a localization device is conceived.

20 Claims, 7 Drawing Sheets

(56) References Cited

OTHER PUBLICATIONS

Venkatesh, S. et al; "Non-line-of-sight Identification in Ultra-Wideband Systems Based on Received Signal Statistics;" Published 2007, Last revised Jan. 17, 2007; IET Microw. Antennas Propag.; DOI:10.1049/IET-MAP:20060273.

Yu, Kegen et al.; "Statistical NLOS Identification Based on AOA, TOA, and Signal Strength;" IEEE Transactions on Vehicular Technology, Jan. 2009; vol. 58, No. 1.

* cited by examiner

LOCALIZATION DEVICE AND METHOD OF OPERATING A LOCALIZATION DEVICE

CROSS-REFERENCE TO RELATED APPLICATIONS

This application claims priority under 35 U.S.C. § 119 to European Patent Application No. 20163370.8, filed on Mar. 16, 2020, the contents of which are incorporated by reference herein.

TECHNICAL FIELD

The present disclosure relates to a localization device. Furthermore, the present disclosure relates to a corresponding method of operating a localization device.

BACKGROUND

Localization systems are systems in which the position of one or more objects are determined. Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for localization devices. For this reason, localization systems often make use of UWB technology. Nevertheless, in certain cases, UWB-based localization systems may not be capable of accurately determining the position of an object.

SUMMARY

In accordance with a first aspect of the present disclosure, a localization device is provided, comprising: an ultra-wideband, UWB, communication unit configured to transmit a localization signal to an external device and to receive a response signal from the external device; an angle of arrival measurement unit configured to measure an angle at which the response signal is received; an orientation sensor configured to sense an orientation of the localization device; and a processing unit configured to determine if an angle at which the localization signal is received by the external device, an orientation of the external device, said orientation of the localization device, and said angle at which the response signal is received meet a predefined relationship.

In one or more embodiments, the localization device is configured to receive data indicative of said angle at which the localization signal is received and data indicative of the orientation of the external device from the external device.

In one or more embodiments, the UWB communication unit is configured to receive the data indicative of said angle at which the localization signal is received and the data indicative of the orientation of the external device.

In one or more embodiments, the processing unit is configured to use the angle at which the response signal is received for localizing the external device if the predefined relationship is met.

In one or more embodiments, the processing unit is configured to estimate a position of the external device using said angle at which the response signal is received and a distance determined on the basis of a time of flight of the localization signal and the response signal.

In one or more embodiments, the processing unit is configured to not use the angle at which the response signal is received for localizing the external device if the predefined relationship is not met.

In one or more embodiments, the orientation sensor includes a magnetometer. In one or more embodiments, the orientation sensor further includes a gyroscope, and wherein the orientation sensor is configured to sense the orientation of the localization device using both the magnetometer and the gyroscope.

In one or more embodiments, the processor is configured to trigger a movement of the localization device if the predefined relationship is not met.

In one or more embodiments, the processor is configured to trigger said movement by causing a user interface unit comprised in the localization device to prompt a user to move the localization device.

In one or more embodiments, the processing unit is a microprocessor.

In accordance with a second aspect of the present disclosure, a method of operating a localization device is conceived, the localization device comprising an ultra-wideband, UWB, communication unit, an angle of arrival measurement unit, an orientation sensor and a processing unit, the method comprising: transmitting, by the UWB communication unit, a localization signal to an external device and receiving a response signal from the external device; measuring, by the angle of arrival measurement unit, an angle at which the response signal is received; sensing, by the orientation sensor, an orientation of the localization device; determining, by the processing unit, if an angle at which the localization signal is received by the external device, an orientation of the external device, said orientation of the localization device, and said angle at which the response signal is received meet a predefined relationship.

In one or more embodiments, the localization device receives data indicative of said angle at which the localization signal is received and data indicative of the orientation of the external device from the external device.

In one or more embodiments, the UWB communication unit receives the data indicative of said angle at which the localization signal is received and the data indicative of the orientation of the external device. In one or more embodiments, the processing unit uses the angle at which the response signal is received for localizing the external device if the predefined relationship is met.

DESCRIPTION OF DRAWINGS

Embodiments will be described in more detail with reference to the appended drawings, in which.

DESCRIPTION OF EMBODIMENTS

Localization systems are systems in which the position of one or more objects are determined. Ultra-wideband (UWB)

is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for localization devices. For this reason, localization systems often make use of UWB technology. Nevertheless, in certain cases, UWB-based localization systems may not be capable of accurately determining the position of an object.

UWB-based localization systems may be based on a distance measurement between a localization device and an external device whose position should be determined. The distance measurement may for example be based on a measurement of the time of flight between the localization device and the external device. In that case, the time of flight is the time that is required for a bidirectional message exchange between the localization device and the external device (i.e., an exchange consisting of a localization signal sent by the localization device and a corresponding response signal sent by the external device). To determine the position of the external device, the localization device may combine the angle of arrival of the response signal with the measured distance. However, erroneous measurements of the angle of arrival (AOA) have a large impact on the system stability. Therefore, it is useful to detect and filter such erroneous measurements. In particular, for UWB-based distance measurements it may be difficult to determine if a distance measurement was performed in a line of sight (LOS) scenario or in a non-line of sight (NLOS) scenario. Such a determination may be made in a system that includes more components (i.e., redundant components), but this increases the cost of the system.

Now discussed are a localization device and a corresponding method of operating a localization device, which facilitate determining if a distance measurement was performed in a line of sight (LOS) scenario or in a non-line of sight (NLOS) scenario, without significantly increasing the cost of the localization device.

Figure 1:
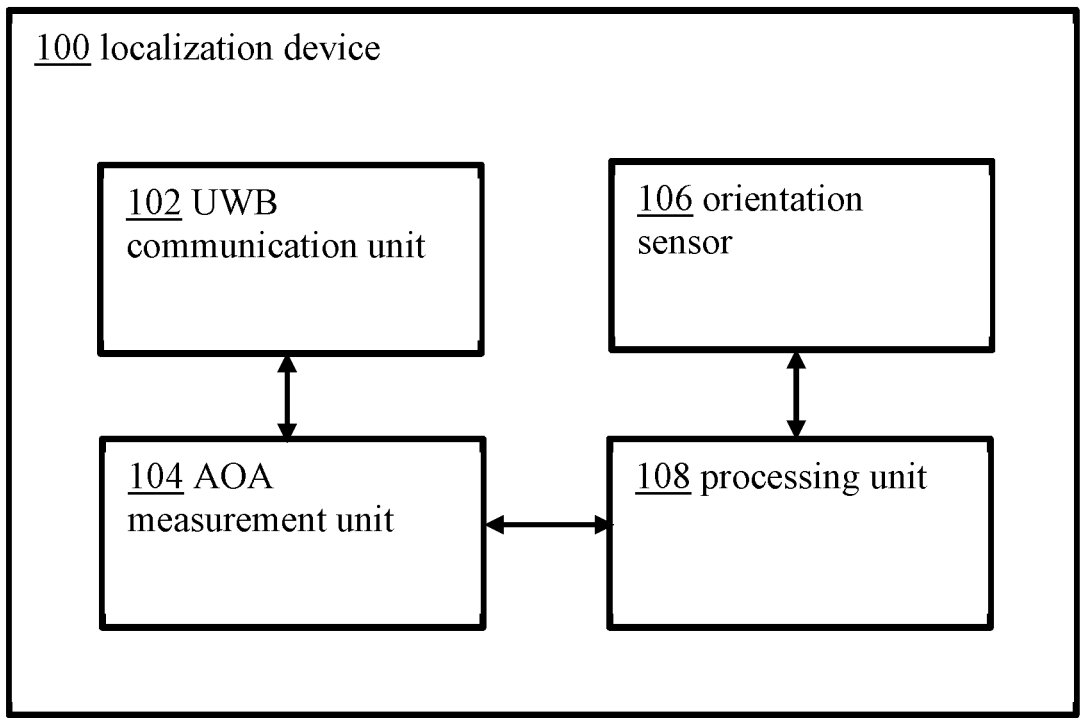
FIG. 1 shows an illustrative embodiment of a localization device.

FIG. 1 shows an illustrative embodiment of a localization device 100. The localization device 100 comprises a UWB communication unit 102, an angle of arrival (AOA) measurement unit 104, an orientation sensor 106, and a processing unit 108. The UWB communication unit 102 is configured to transmit a localization signal to an external device (not shown) and to receive a response signal from the external device. More specifically, the response signal is a signal that is transmitted by the external device in response to the localization signal transmitted by the UWB communication unit 102 of the localization device 100. It is noted that the external device is a device that is not included in the localization device 100. Furthermore, the AOA measurement unit 104 is configured to measure an angle at which the response signal is received. Furthermore, the orientation sensor 106 is configured to sense an orientation of the localization device 100. Finally, the processing unit 108 is configured to determine if an angle at which the localization signal is received by the external device, an orientation of the external device, the orientation of the localization device, and the angle at which the response signal is received meet a predefined relationship. By performing an angle of arrival measurement and an orientation measurement on both sides of a localization session (i.e., by the localization device and the external device), and combining the resulting measurement data, NLOS measurements can be distinguished from LOS measurements. Then, NLOS measurement data may for example be discarded, while LOS measurement data may be used for localizing the external device.

In one or more embodiments, the localization device is configured to receive data indicative of said angle at which the localization signal is received and data indicative of the orientation of the external device from the external device. In this way, the localization device easily obtains the relevant data for verifying whether the predefined relationship is met. Furthermore, in one or more embodiments, the UWB communication unit is configured to receive the data indicative of said angle at which the localization signal is received and the data indicative of the orientation of the external device. In this way, the UWB channel is used to provide the relevant data to the localization device, such that no additional communication channel is needed. This may be referred to as an "in-band" exchange of data. Alternatively, the localization device may comprise another communication unit for receiving said data, such as a Bluetooth or a Wi-Fi communication unit. In this way, the burden on the UWB channel may be reduced. This may be referred to as an "out-of-band" exchange of data.

In one or more embodiments, the processing unit is configured to use the angle at which the response signal is received for localizing the external device if the predefined relationship is met. Thus, if the predefined relationship is met, it is concluded that the distance measurement is an LOS measurement, such that the distance measurement and the angle of arrival of the response signal may be used for localizing the external device. Accordingly, the localization becomes more reliable. Furthermore, in a practical implementation, the processing unit is configured to estimate a position of the external device using said angle at which the response signal is received and a distance determined on the basis of a time of flight of the localization signal and the response signal. In one or more embodiments, the processing unit is configured to not use the angle at which the response signal is received for localizing the external device if the predefined relationship is not met. Thus, if the predefined relationship is not met, it is concluded that the distance measurement is an NLOS measurement, such that the resulting measurement data may for example be discarded. Accordingly, the localization becomes again more reliable.

In a practical implementation, the orientation sensor includes a magnetometer. Furthermore, to achieve a more accurate orientation measurement, the orientation sensor further includes a gyroscope, and the orientation sensor is configured to sense the orientation of the localization device using both the magnetometer and the gyroscope. Furthermore, in one or more embodiments, the processor is configured to trigger a movement of the localization device if the predefined relationship is not met. In this way, it becomes more likely that an NLOS measurement will be avoided during a next distance measurement. In a practical implementation, the processor is configured to trigger said movement by causing a user interface unit comprised in the localization device to prompt a user to move the localization device. Furthermore, in a practical implementation, the processing unit is a microprocessor.

Figure 2:
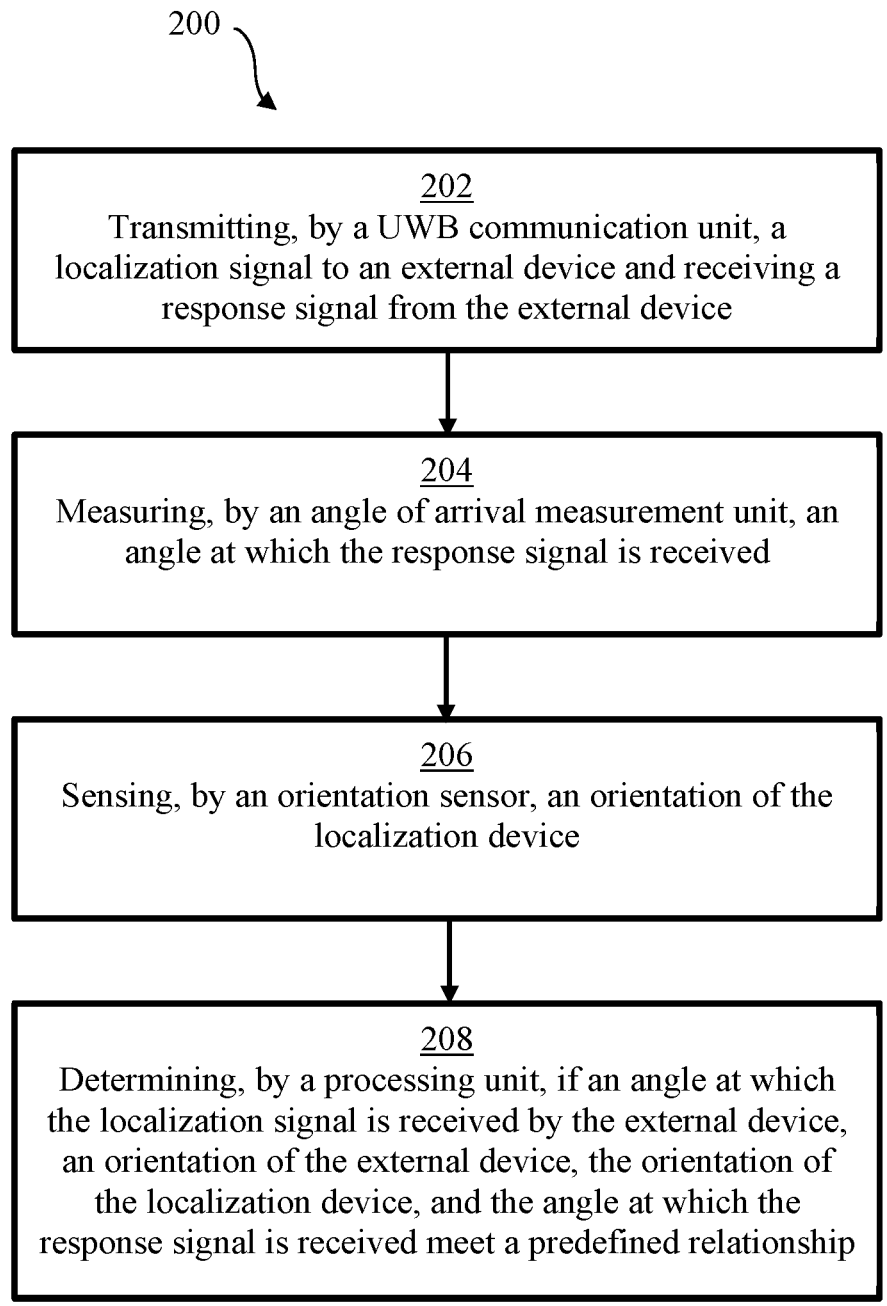
FIG. 2 shows an illustrative embodiment of a method of operating a localization device.

FIG. 2 shows an illustrative embodiment of a method 200 of operating a localization device. The method 200 comprises, at 202, transmitting, by a UWB communication unit, a localization signal to an external device and receiving a response signal from the external device; at 204, measuring, by an angle of arrival measurement unit, an angle at which the response signal is received; at 206, sensing, by an orientation sensor, an orientation of the localization device; and at 208, determining, by a processing unit, if an angle at which the localization signal is received by the external device, an orientation of the external device, the orientation of the localization device, and the angle at which the response signal is received meet a predefined relationship. The method 200 facilitates determining if a distance measurement was performed in a line of sight (LOS) scenario or in a non-line of sight (NLOS) scenario, without significantly increasing the cost of the localization device.

Figure 3:
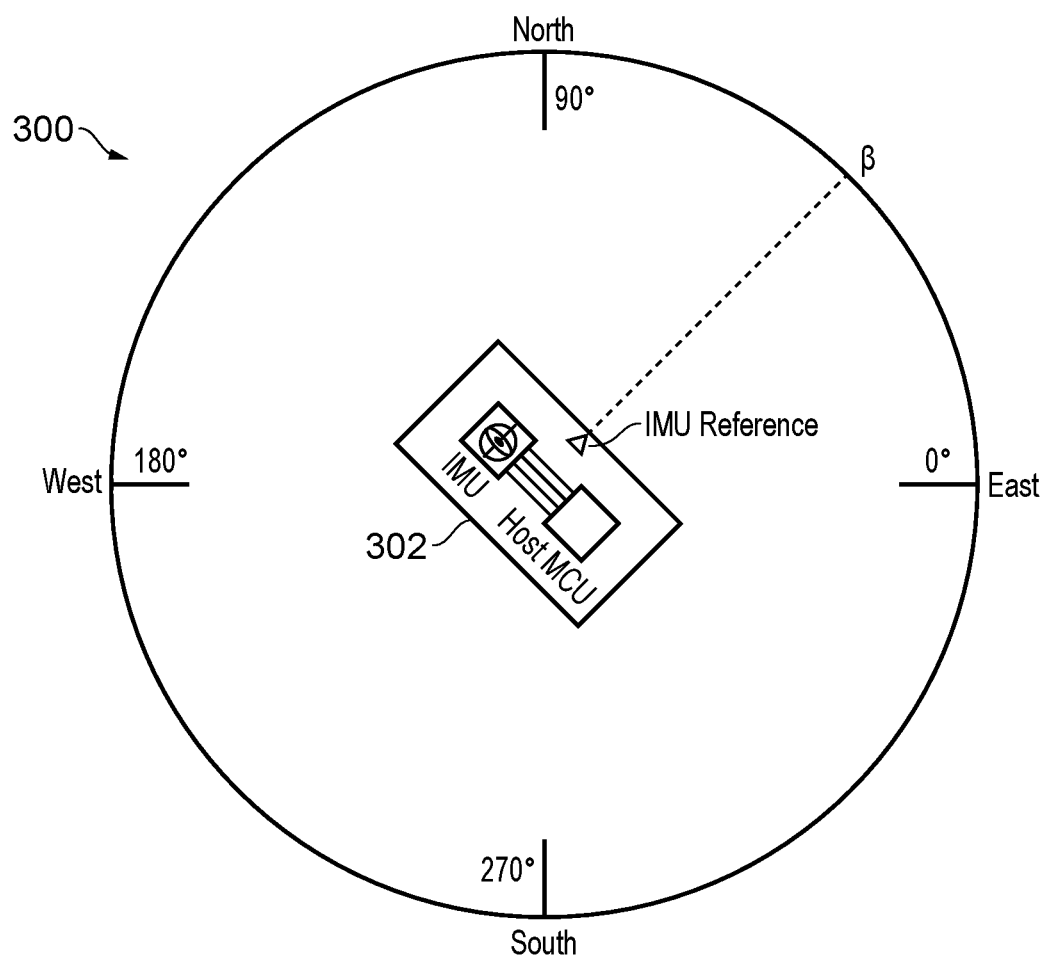
FIG. 3 shows an example of an orientation measurement.

FIG. 3 shows an example of an orientation measurement 300. The orientation measurement 300 is performed by an orientation measurement device 302, which contains an inertial measurement unit (IMU) and a processing unit (i.e., a host microcontroller). An inertial measurement unit (IMU) is used by many embedded systems for measuring the movement of the system attached to the IMU. Inertial measurement units often include a three-axes magnetometer, a three-axes gyroscope and a three-axes accelerometer. The magnetometer uses the magnetic field of the earth as a reference for estimating the orientation of the IMU in comparison to an absolute coordinate system. A magnetometer may have a slow update rate, as a result of which it cannot be used for tracking small but fast orientation changes. A gyroscope can track the fast movement, but therefore it can only determine dynamic changes which may lead to a drift-caused measurement error. By combining the magnetometer with the gyroscope, fast and accurate measurements are possible because of the magnetometer measurements that can be used as a reference for the gyroscope measurement. Every time when the magnetometer measures its orientation in comparison to the magnetic field of the earth, the gyroscope uses this orientation as a reference for is measurements. Accordingly, the gyroscope only has small drifts between different magnetometer measurements. This increases the orientation measurement accuracy in general.

FIG. 3 shows an example of an embedded system (i.e., an orientation measurement device 302) that comprises an IMU and a microcontroller (MCU) reading the IMU data. The system is orientated in the angle 13 in comparison to the magnetic field of the earth. The reference point for the orientation measurement is drawn as a small arrow in the figure. This reference point for the angle measurement can be changed by the MCU depending on the later application. The linear acceleration sensor of an IMU is mainly used for movement detection in an embedded system of the kind set forth. In theory, by integrating the linear acceleration twice, the position of a device can be estimated by combining these data with the known orientation of the IMU. However, similar to the gyroscope, the linear acceleration sensors also have a measurement inaccuracy. Since acceleration data need to be integrated twice for estimating the position of the IMU, the drift-caused positioning error is significantly larger than the gyroscope error.

Figure 4:
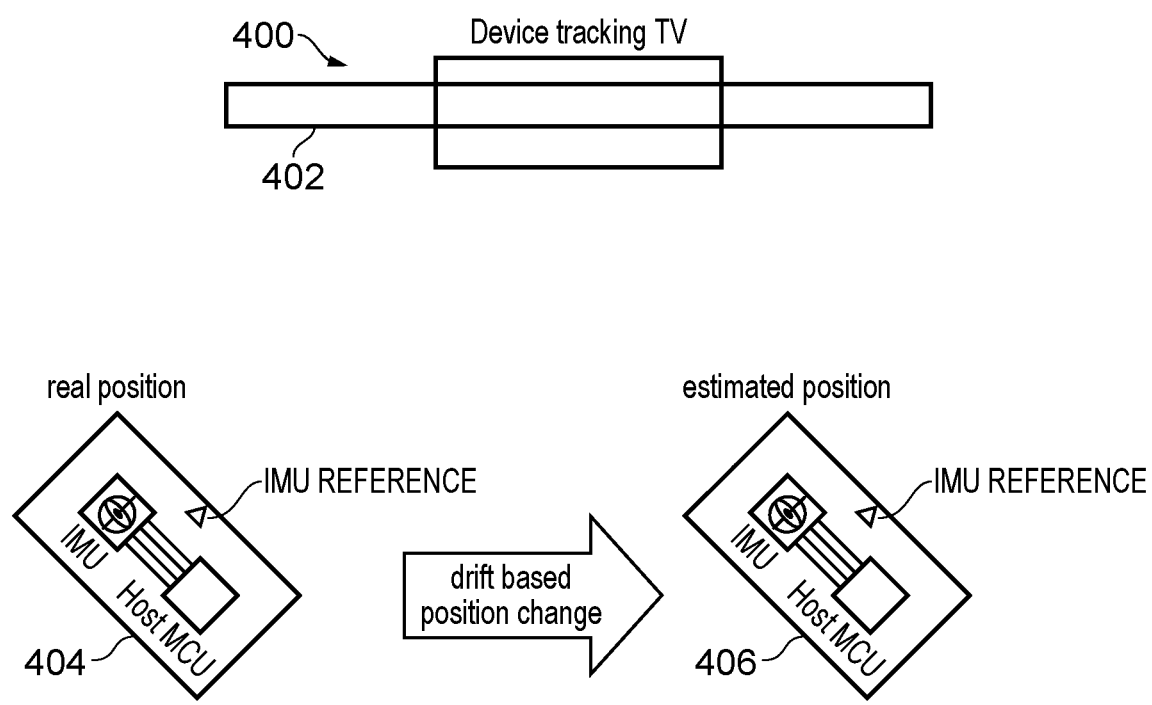
FIG. 4 shows an example of a position determination system.

FIG. 4 shows an example of a position determination system 400. The system 400 comprises a television (TV) 402 which tracks the position of an external device. The estimated position 406 of the external device may be different from the real position 404 of the external device, which may be caused by measurement drifts. In particular, the television 402 attempts to track the position of the embedded system based on the IMU data. Even if the initial speed and position of the IMU are known, the external device will start drifting away from its real position 404 based on the measurement data of the IMU. This leads to an erroneous estimated position 406, which may have a major impact on the application that the system should execute.

Figure 5:
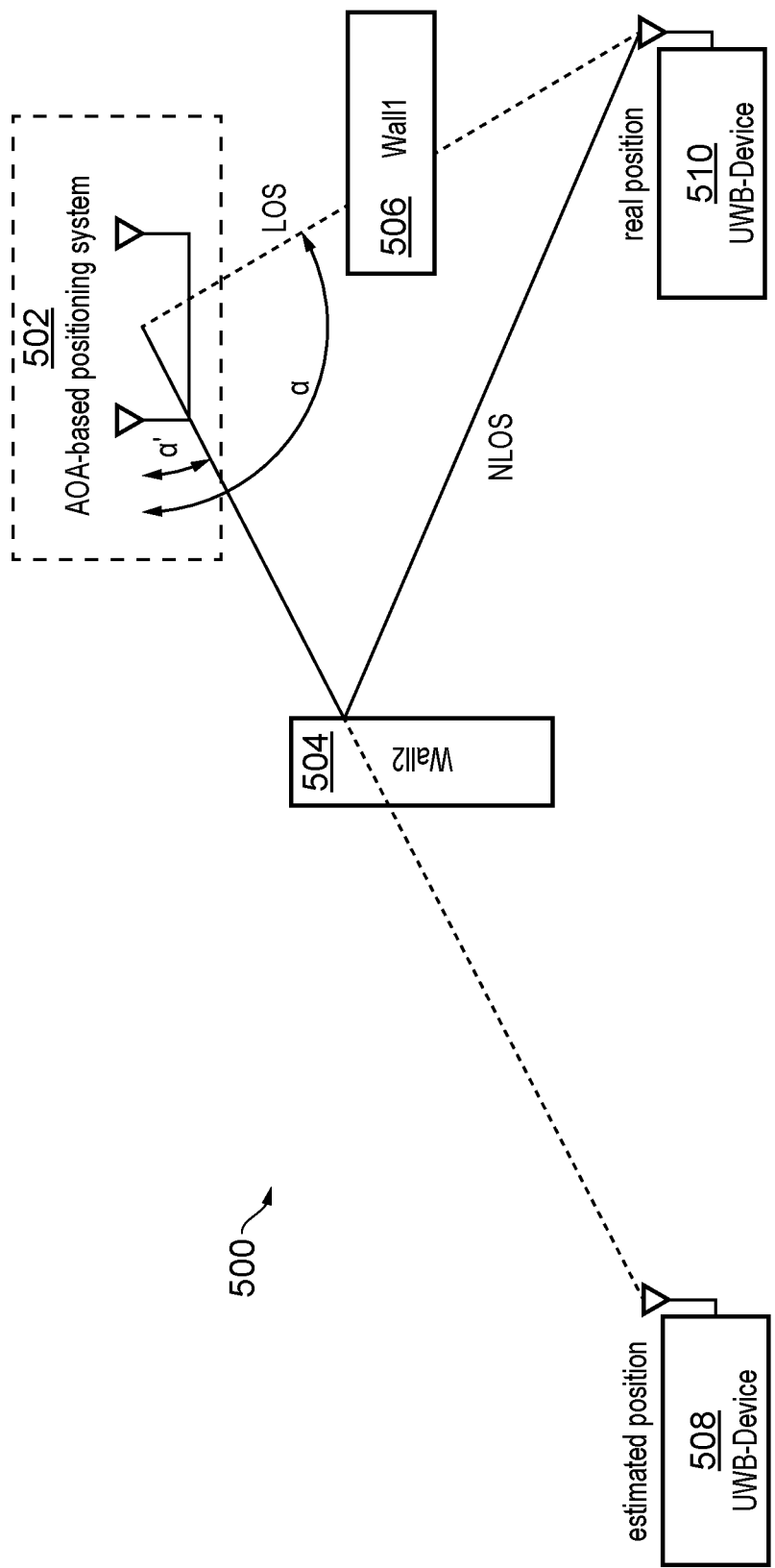
FIG. 5 shows another example of a position determination system.

FIG. 5 shows another example of a position determination system 500. The system 500 comprises an angle of arrival-based positioning system 502 and an external UWB-enabled device whose position should be determined. The estimated position 508 of the UWB-enabled device may differ from the real position 510 of the UWB-enabled device, as a result of a non-light of sight distance measurement.

UWB technology is a pulse-based RF communication technology that can be used for estimating the distance between two devices. The distance between two devices may be determined indirectly by measuring the time of flight (TOF) between said devices. The TOF is estimated by storing a timestamp every time when a message is sent or received. Based on the timestamps of a bidirectional message exchange, the TOF can be estimated. Such a measurement method is also known as two-way ranging (TWR). Since a UWB-based distance measurement combines the signal propagation time and the signal propagation speed for estimating the distance between two devices, it is useful that the first path of the signals is used for the distance measurement. If a signal reflection instead of the first path is used for the distance measurement, the estimated distance is the reflection TOF multiplied by the signal propagation speed, which may lead to a significant measurement error. Such a scenario is also called a non-line of sight (NLOS) measurement. If the measured distance is combined with the angle of arrival of an incoming signal, the position of a device can be estimated.

FIG. 5 shows a system 500 that includes two UWB devices: a simple external UWB device with only one antenna and an angle of arrival (AOA)-capable positioning system 502 that can measure the AOA and the TOF of a signal. The simple UWB device and AOA-capable device perform a TWR operation for estimating the distance between them. By combining the distance with the measured AOA of the signal the AOA-based positioning system 502 can determine the position of the UWB-device. In the scenario shown in FIG. 5 there are two walls 504, 506 between the devices. A first wall 506 blocks the line of sight (LOS) signal between the two devices. This causes an NLOS scenario with an impact on the TOF and AOA measurement. Since the LOS is blocked the NLOS signal reflected by the second wall 504 is used for the TOF measurement. Also, the angle of the reflection is measured during the AOA measurement instead of the LOS signal angle. Accordingly, the AOA-based positioning system 502 will assume that the external UWB device appears behind the second wall 504 instead of its actual position 510. Especially for applications in which safety and fault tolerance are important, such erroneous measurement should be detected and filtered out, to avoid an unwanted behavior of the system.

In accordance with the present disclosure, IMU technology may be combined with UWB AOA technology for detecting an NLOS signal using only two devices, e.g. an AOA-based positioning system and an external UWB device of the kind set forth. This results in a lower infrastructure cost in comparison to a multi-anchor system that attempts to detect measurement errors by adding redundant positioning systems, for example. Also, by combining the IMU with the AOA measurement the channel utilization stays the same, which represents another advantage over a multi-anchor system.

Figure 6:
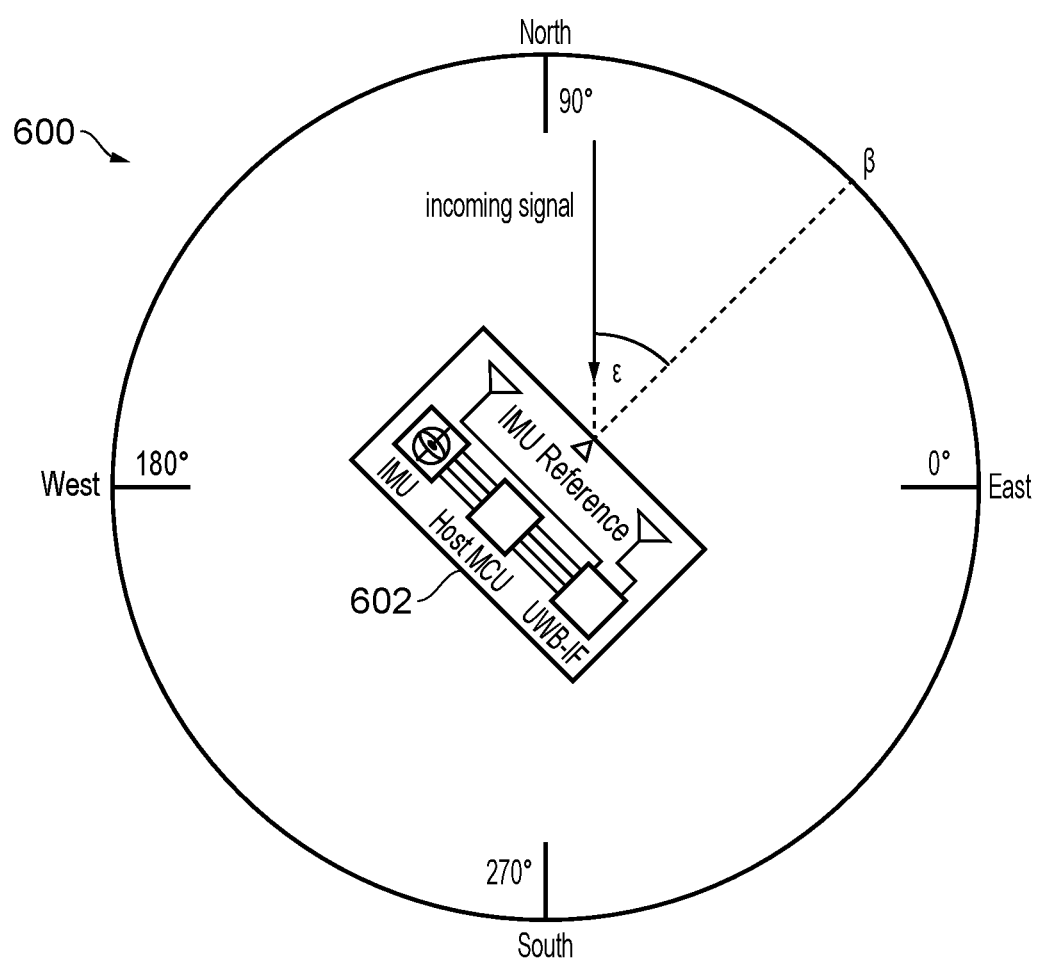
FIG. 6 shows an illustrative embodiment of an orientation and angle of arrival measurement.

FIG. 6 shows an illustrative embodiment of an orientation and angle of arrival measurement 600. The orientation and angle of arrival measurement 600 is performed by an orientation and angle of arrival measurement device 602, which contains an inertial measurement unit (IMU), a UWB communication unit (i.e., a UWB interface), and a processing unit (i.e., a host microcontroller). In this embodiment, an angle of arrival measurement unit is included in the UWB communication unit. Accordingly, IMU data indicative of the orientation of the device 602 may be combined with data indicative of the angle of arrival of the incoming signal (i.e., the angle E) provided by the UWB communication unit. The host microcontroller collects the measurement data generated by the IMU and the UWB communication unit. More specifically, the IMU measures the orientation 13 of the device 602 and the UWB communication unit measures the angle of arrival E of the incoming signal, and the host microcontroller combines the resulting data. To combine these data, the orientation of the antenna axis and the IMU reference point may have to be known by or made available to the host microcontroller.

Figure 7:
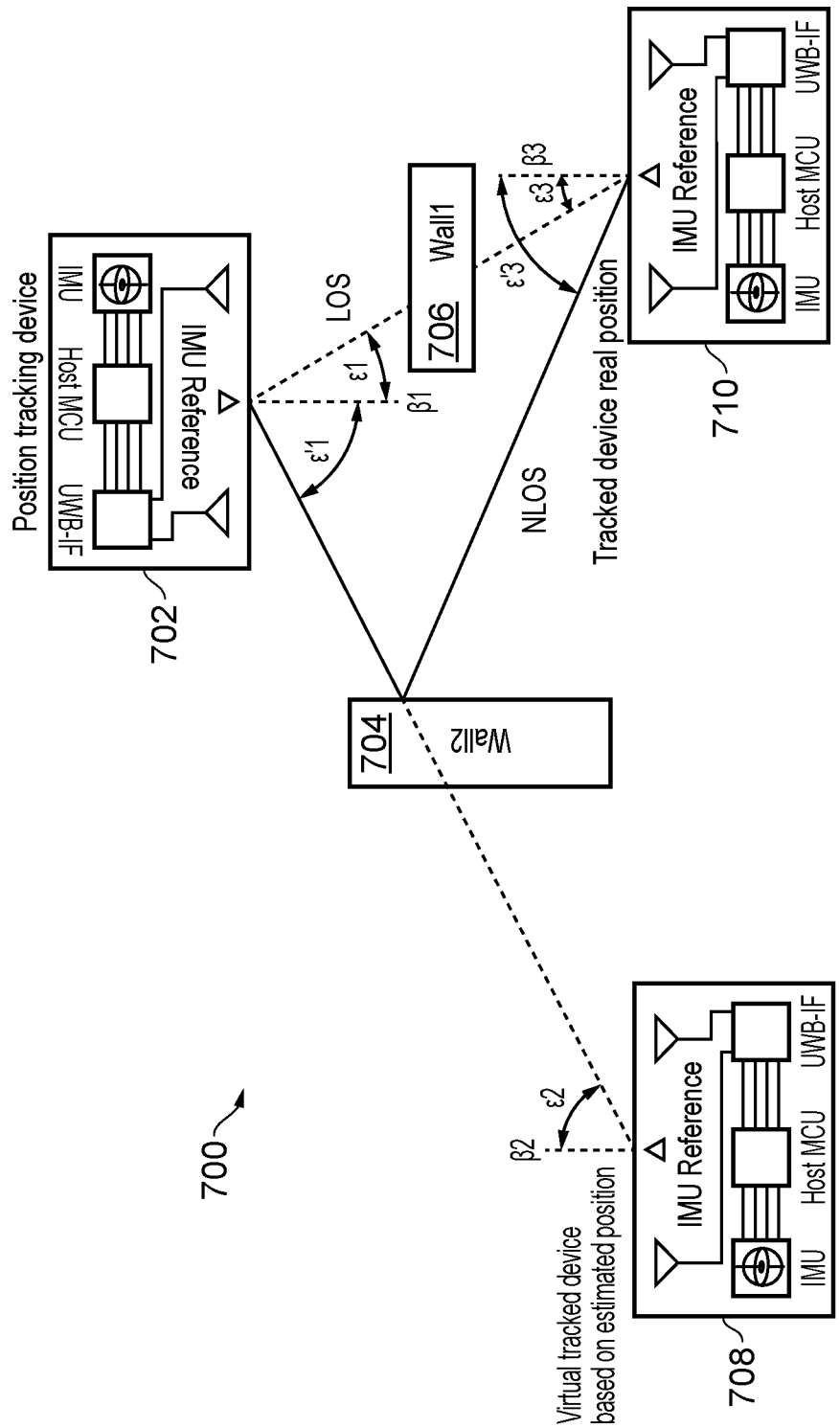
FIG. 7 shows an illustrative embodiment of a position determination system.

FIG. 7 shows an illustrative embodiment of a position determination system 700. The system 700 comprises a device 702 which tracks the position of an external device. In other words, the positioning tracking device 702 is an example of a localization device of the kind set forth. Furthermore, the system comprises an external device of the kind set forth, i.e. a tracked device whose position should be determined. Both devices are AOA-capable devices which contain an IMU. FIG. 7 shows the real position 710 and the virtual, estimated position 708 of the tracked device. The position tracking device 702 has the orientation (31 and the tracked device has the orientation (32 or (33. It is noted that β2 and β3 are the same, because the virtual device 708 and real device 710 have the same orientation. The orientation of the devices is measured by the internal IMU. The position tracking device 702 measures the angle ε'1 based on the received signal which leads to a wrong estimated position 708. The tracked device measures the angel ε'3. If the distance and the angle would have been measured in an LOS scenario, the angle and orientation of the tracking device 702 would have matched with the measured angle and orientation of the tracked device. In other words, the angle and orientation of the tracking device 702 and the measured angle and orientation of the tracked device would in that case meet a predefined relationship.

The embodiment shown in FIG. 7 represents a simplified example of a position determination system in a two-dimensional space, which shows a correlation between two devices that receive an LOS signal. If the measured angle ε3 increases, the measured angle ε1 should also increase, because both angles belong to the same signal. In a three-dimensional application, the behavior of an LOS signal is the same. However, in that case the three-dimensional orientation of the devices should also be considered.

If the measurement is performed in an LOS scenario, the measured angles and orientations of the devices fulfil equation 1 shown below. Accordingly, equation 1 shows an example of a predefined relationship which may be verified by a processing unit of the kind set forth. Thus, the host microcontroller of the position tracking device 702 may verify whether equation 1 is fulfilled, based on its own orientation and measured angle of arrival, and on data indicative of the orientation and angle of arrival of the tracked device. These data may for example be received by the position tracking device 702 through the UWB channel (i.e., an in-band channel) between the two devices, or through an out-of-band communication channel. Equation 1 holds for a two-dimensional scenario, e.g. for devices for which the application ensures that both antenna axes are placed in the same plane or in slightly different planes. In a three-dimensional AOA measurement scenario, the three-dimensional orientation of the antenna axes should be considered as well, and the AOA measurements values should be compared in a common coordinate system. Thus, the AOA measured in the X-plane of the position tracking device 702 should match with the AOA measured in the X-plane of the tracked device. The AOAs measured in the Y-plane should show the same behavior. The signal can only be an LOS signal if the measured angles in both planes match. Otherwise, the AOA of a reflected signal is measured and the signal should not be used for estimating the position of the tracked device. Since FIG. 7 shows a two-dimensional NLOS scenario, in which the left side of the equation will not fit to the right side of the equation, which means that the position tracking device 702 is able to detect the NLOS scenario. This is shown in equation 2, which illustrates that the predefined relationship is not met in an NLOS scenario.

(Equation 1–LOS) $\beta1+\epsilon1=\beta3+\epsilon3+180°$ (Equation 2–NLOS) $\beta1+\epsilon'1\neq\beta3+\epsilon'3+180°$ It is noted that, in order to distinguish between an NLOS and a LOS scenario, it may be useful to consider the counting direction of the IMU and AOA measurement, as well as the orientation-based antenna axis change. For example, if a device is rotated around the IMU axis by 180°, the antenna axis is also rotated (i.e., the sign of the measured angle changes) which should be considered when the AOA measurement is combined with the orientation of the device. Furthermore, the measurement inaccuracy caused by device limitations may have to be considered.

FIG. 7 shows a two-dimensional example of an NLOS scenario, in which all antenna axes are placed in the same plane. For example, if one device is rotated around the IMU reference axis by 90°, the AOA data cannot be used for detecting if the measurement was made in LOS or NLOS because of the orthogonally oriented antenna axes. Therefore, if both antenna axes are not placed in the same plane, a three-dimensional AOA measurement with at least two antenna axes per device, which are not placed in parallel, should be considered for ensuring that an NLOS scenario can be always detected. Ideally, the two axes within the device should be orthogonal to each other. If an NLOS scenario has been detected, the higher application layer may be configured to respond to it, e.g. by triggering a movement of the devices.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 localization device
102 ultra-wideband (UWB) communication unit
104 angle of arrival (AOA) measurement unit
106 orientation sensor
108 processing unit
200 method of operating a localization device
202 transmitting, by a UWB communication unit, a localization signal to an external device and receiving a response signal from the external device
204 measuring, by an angle of arrival measurement unit, an angle at which the response signal is received
206 sensing, by an orientation sensor, an orientation of the localization device
208 determining, by a processing unit, if an angle at which the localization signal is received by the external device, an orientation of the external device, the orientation of the localization device, and the angle at which the response signal is received meet a predefined relationship
300 orientation measurement
302 orientation measurement device
400 position determination system
402 television which tracks the position of an external device
404 real position of the external device
406 estimated position of the external device
500 position determination system
502 AOA-based positioning system
504 wall
506 wall
508 estimated position of external UWB-device
510 real position of external UWB-device
600 orientation and angle of arrival measurement
602 orientation and angle of arrival measurement device
700 position determination system
702 device which tracks the position of an external device
704 wall
706 wall
708 virtual tracked device based on estimated position
710 tracked device real position

What is claimed is:

1. A localization device, comprising:
an ultra-wideband, UWB, communication unit configured to transmit a localization signal to an external device and to receive a response signal from the external device;
an angle of arrival measurement unit configured to measure an angle at which the response signal is received;
an orientation sensor configured to sense an orientation of the localization device; and
a processing unit configured to determine if an angle at which the localization signal is received by the external device, an orientation of the external device, said orientation of the localization device, and said angle at which the response signal is received meet a predefined relationship in which the angle at which the response signal is received and the orientation of the localization device matches the angle at which the localization signal is received by the external device and the orientation of the external device.

2. The localization device of claim 1, wherein the localization device is configured to receive data indicative of said angle at which the localization signal is received and data indicative of the orientation of the external device from the external device.

3. The localization device of claim 2, wherein the UWB communication unit is configured to receive the data indicative of said angle at which the localization signal is received and the data indicative of the orientation of the external device.

4. The localization device of claim 1, wherein the processing unit is configured to use the angle at which the response signal is received for localizing the external device if the predefined relationship is met.

5. The localization device of claim 4, wherein the processing unit is configured to estimate a position of the external device using said angle at which the response signal is received and a distance determined on the basis of a time of flight of the localization signal and the response signal.

6. The localization device of claim 1, wherein the processing unit is configured to not use the angle at which the response signal is received for localizing the external device if the predefined relationship is not met.

7. The localization device of claim 1, wherein the orientation sensor includes a magnetometer.

8. The localization device of claim 7, wherein the orientation sensor further includes a gyroscope, and wherein the orientation sensor is configured to sense the orientation of the localization device using both the magnetometer and the gyroscope.

9. The localization device of claim 1, wherein the processing unit is configured to trigger a movement of the localization device if the predefined relationship is not met.

10. The localization device of claim 9, wherein the processing unit is configured to trigger said movement by causing a user interface unit comprised in the localization device to prompt a user to move the localization device.

11. The localization device of claim 1, wherein the processing unit is a microprocessor.

12. A method of operating a localization device, the localization device comprising an ultra-wideband, UWB, communication unit, an angle of arrival measurement unit, an orientation sensor and a processing unit, the method comprising:

transmitting, by the UWB communication unit, a localization signal to an external device and receiving a response signal from the external device;

measuring, by the angle of arrival measurement unit, an angle at which the response signal is received;

sensing, by the orientation sensor, an orientation of the localization device; and determining, by the processing unit, if an angle at which the localization signal is received by the external device, an orientation of the external device, said orientation of the localization device, and said angle at which the response signal is received meet a predefined relationship in which the angle at which the response signal is received and the orientation of the localization device matches the angle at which the localization signal is received by the external device and the orientation of the external device.

13. The method of claim 12, wherein the localization device receives data indicative of said angle at which the localization signal is received and data indicative of the orientation of the external device from the external device.

14. The method of claim 13, wherein the UWB communication unit receives the data indicative of said angle at which the localization signal is received and the data indicative of the orientation of the external device.

15. The method of claim 12, wherein the processing unit uses the angle at which the response signal is received for localizing the external device if the predefined relationship is met.

16. The method of claim 12, wherein the processing unit estimates a position of the external device using said angle at which the response signal is received and a distance determined on the basis of a time of flight of the localization signal and the response signal.

17. The method of claim 12, wherein the processing unit does not use the angle at which the response signal is received for localizing the external device if the predefined relationship is not met.

18. The method of claim 12, wherein the orientation sensor includes a magnetometer.

19. The method of claim 18, wherein the orientation sensor further includes a gyroscope, and wherein the orientation sensor senses the orientation of the localization device using both the magnetometer and the gyroscope.

20. The method of claim 12, wherein the processing unit triggers a movement of the localization device if the predefined relationship is not met.

* * * * *